F. A. STEVENS.
Car Brake.
No. 8,552.
Patented Nov. 25, 1851.
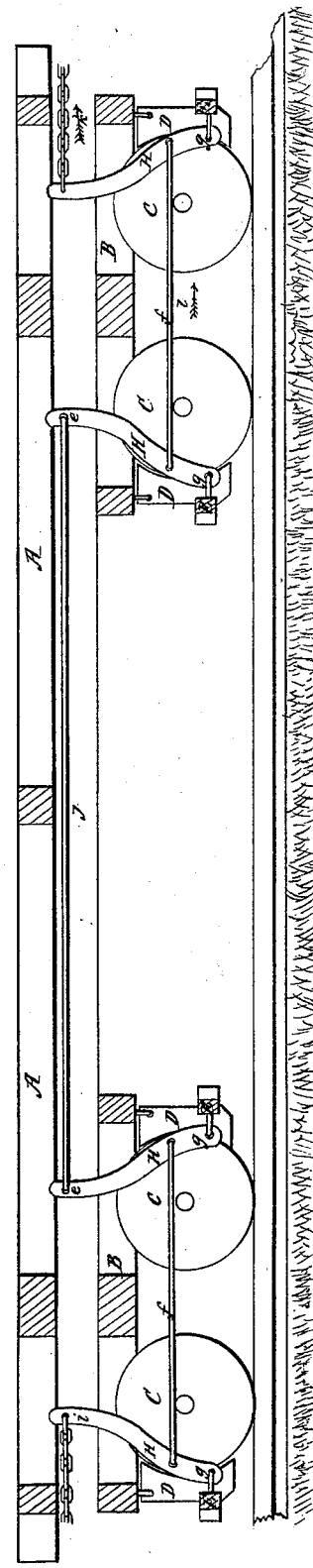

UNITED STATES PATENT OFFICE.

FRANCIS A. STEVENS, OF BURLINGTON, VERMONT.

RAILROAD-CAR BRAKE.

Specification of Letters Patent No. 8,552, dated November 25, 1851.

*To all whom it may concern:*

Be it known that I, FRANCIS A. STEVENS, of Burlington, in the county of Chittenden and State of Vermont, have invented a new and useful Improvement in Railroad-Car Brakes; and I do hereby declare that the following is a full, clear, and exact description of my said invention, reference being had to the accompanying drawing, which forms part of this specification and represents a longitudinal section of the running gear of an eight wheeled railroad car with my compound compensating brake applied thereto.

My improved railroad car brake is constructed in such manner that the friction shoes of all the wheels of the car are brought into action simultaneously and each shoe throughout the whole series is pressed against its respective wheel with the same amount of force.

In the accompanying drawing A is the frame of the car and B, B, are the frames of the two four-wheeled trucks. Each wheel C of each truck is fitted with a friction shoe D and the two friction shoes of each pair of wheels are connected by a brake beam E, that extends across the truck. Each brake beam is connected at its middle with the lower arm $g$ of an upright brake lever H; and the fulcrums or turning points of the two brake levers of a truck are also connected by a link rod $f$. The upper arm $i$ of the brake lever which is nearer the end of the car is connected by a rod or chain with the brake wheel; and the upper arm $e$ of the brake lever nearer the middle of a car is connected by a rod $j$ with the upper arm of the corresponding brake lever of the other truck.

It will now be seen that if a force be applied to draw the chain at one end of the car in the direction indicated by the arrow $k$ while the chain at the opposite end remains stationary the whole series of levers and shoes will be moved and the shoes will all be pressed against their respective wheels with equal force; for the force exerted upon the first lever is propagated by means of the link rods to the succeeding ones. Thus for example if the longer and shorter arms of the levers bear to each other the relation of 3 to 1 and the chain be drawn with a force of 100 pounds the pair of shoes operated by the first brake lever will be pressed against their wheels with a force of 300 pounds while the fulcrum rod $f$ will be drawn in the direction indicated by the arrow $l$ with a force of $300+100=400$ pounds. The fulcrum of the next succeeding brake lever having thus a force of 400 pounds applied to it will move, and, as its arms bear to each other the above stated relation of 3 to 1, its shorter arm will press forward its shoes with a force of 300 pounds, while the longer arm will act through the link rod $j$ upon the longer arm of the next succeeding brake lever with a force of 100 pounds. This latter will act upon its respective shoes in the same manner as the first lever in the series and with the same force; the pressure upon its fulcrum will also be communicated to that of the last brake lever which will thus act in the same manner as the second one in the series. It is therefore evident that by connecting the brake levers alternately by their arms and fulcrums as herein set forth, the force exerted to move one will be propagated throughout a series of any number.

It is evident that this system of brakes is not confined in its application to a single car, but that the force applied to a single brake wheel may be propagated throughout the whole train by merely connecting the brake chain of each car with that of the succeeding one. In this case the upper arm of the last brake lever in the train will become the fixed point in the whole series and all the levers will be moved to press their respective friction shoes against their wheels with the same force as the one which is moved directly by the brake wheel chain.

The construction and arrangement of this system of car brakes can be variously modified without affecting the principle upon which it acts; thus for example the brake lever may be levers of the second order, their fulcra being at their lower extremities and the brake beams being connected with the levers at points intermediate between their lower and upper extremities. In this case the lower extremities or fulcra of the two levers of each truck will be connected by a rod; the upper extremity of the brake lever of each truck farther from the adjacent brake wheel will be connected therewith by a chain and the upper extremities of the other two or outermost brake levers will be connected by a rod.

What I claim as my invention and desire to secure by Letters Patent is—

The combination and arrangement of the levers, link rods, and shoes or rubbers substantially as herein described whereby each wheel of both trucks of a car is retarded with a uniform force when the brake is put into operation.

In testimony whereof I have hereunto subscribed my name.

F. A. STEVENS.

Witnesses:
　AMASA DREW,
　JAMES H. FISK.